United States Patent [19]

Asano et al.

[11] 3,711,537
[45] Jan. 16, 1973

[54] PROCESS FOR THE PREPARATION OF TRANS 4-AMINOMETHYLCYCLOHEXANE-1-CARBOXYLIC ACID

[76] Inventors: Kiro Asano, 2-23, Azabujyuban, Minato-ku, Tokyo; Hitoshi Takita, No. 3897, Kamitsuruma, Sagamihara-shi, Kanagawa; Noriyuki Toyotla, No. 3-10-12, Nerima; Masaaki Takahashi, No. 1-8, Toyotamakita, both of Nerima-ku, Tokyo; Shigeyuki Suzuki, No. 1-2-10, Igusa-cho, Suginami-ku, Tokyo, all of Japan

[22] Filed: July 31, 1970

[21] Appl. No.: 60,138

[30] Foreign Application Priority Data

July 31, 1969   Japan..............................44/59965

[52] U.S. Cl. .............260/514 J, 260/78 A, 260/78 L, 260/785 C, 260/239.3 B, 260/514 G
[51] Int. Cl......................C07c 101/04, C07c 103/52
[58] Field of Search......................260/78 A, 514, 468

[56]   References Cited

UNITED STATES PATENTS 2,790,788   4/1957   Kamlet...................................260/78

FOREIGN PATENTS OR APPLICATIONS 4,314,209   6/1968   Japan................................260/514

OTHER PUBLICATIONS

Muhler et al., Biological Chemistry, p. 32 (1966)

*Primary Examiner*—Lorraine A. Weinberger
*Assistant Examiner*—Robert Gerstl
*Attorney*—Sughrue, Rothwell, Mion, Zinn and Macpeak

[57]   ABSTRACT

A process for preparing the trans isomer of 4-aminomethylcyclohexane-1-carboxylic acid easily and in a good yield, is disclosed. The process comprises hydrolyzing in the presence of an acid or an alkali a polymer prepared by polymerization of the cis isomer of 4-aminomethylcyclohexane-1-carboxylic acid, a mixture of the cis isomer and the trans isomer of the carboxylic acid, or further 3-azabicyclo [3,2,2]-nonanone-2 or a mixture of the nonanone and the cis isomer or the trans isomer or a mixture thereof, under suitable conditions and then treating the product obtained with an ion exchange resin.

8 Claims, No Drawings

PROCESS FOR THE PREPARATION OF TRANS 4-AMINOMETHYLCYCLOHEXANE-1-CARBOXYLIC ACID

BACKGROUND OF THE INVENTION

1. Field of the Invention

The present invention relates to a process for preparing the trans isomer of 4-aminomethylcyclohexane-1-carboxylic acid. More particularly, the invention relates to a novel process for the preparation of the trans isomer of 4-aminomethylcyclohexane-1-carboxylic acid obtained by hydrolyzing in the presence of an acid or an alkali, a polymer prepared by the polymerization of the cis isomer of 4-aminomethylcyclohexane-1-carboxylic acid or a mixture of the cis isomer and the trans isomer of the carboxylic acid, or 3-azabicyclo [3,2,2] nonanone-2, or a mixture of said nonane and said cis isomer or said trans isomer or a mixture thereof, under suitable conditions and then heating the product prepared by the hydrolysis with an ion exchange resin.

2. Description of the Prior Art

As is well known, the trans isomer of 4-aminomethylcyclohexane-1-carboxylic acid is an extremely valuable raw material for medicines or high molecular weight materials. A known process for producing the trans isomer, comprises converting the cis isomer of the carboxylic acid into the trans isomer by treating the cis isomer in a dilute alkaline solution at a high temperature for a long period of time. Another process is known in which p-aminomethyl benzoic acid or a derivative thereof is nucleus-hydrogenated and then the product further is treated at a high temperature. However, since the conventional processes described above are conducted in dilute aqueous solutions, they are accompanied with the disadvantages that the size of the apparatus for conducting the process is large and additionally, a long period of time is required for completion of the process.

An object of the invention is an industrially and economically profitable process for producing the trans isomer of 4-aminomethylcyclohexane-1-carboxylic acid unaccompanied by the above-described disadvantages.

SUMMARY OF THE INVENTION

The inventors have discovered that the trans isomer can be very easily obtained by hydrolyzing in the presence of an acid or an alkali, a polymer prepared by the polymerization of the cis isomer of 4-aminomethylcyclohexane-1-carboxylic acid, a mixture of the cis isomer and the trans isomer of the carboxylic acid, or further 3-arabicyclo [3,2,2] nonanone-2, or a mixture of the nonanone and the cis isomer or the trans isomer of a mixture thereof, under suitable conditions and then treating the product thus prepared by the hydrolysis with an ion-exchange resin. More specifically, the polymer obtained using the above-described process has the trans stereochemical configuration at a proportion of from 60 to 90%. Further, by hydrolyzing the polymer, the trans isomer can be obtained in a high purity of greater than 95 percent.

DETAILED DESCRIPTION OF THE INVENTION

The polymerization or the copolymerization of one or more components of the cis isomer of 4-aminomethylcyclohexane-1-carboxylic acid, a mixture of the cis isomer and the trans isomer of the carboxylic acid, and 3-azabicyclo [3,2,2] nonanone-2 is conducted in an autoclave in an inert gas or steam in the presence of from 0.2 to 60 percent by weight water for from 210°–300°C. The results obtained with a nuclear magnetic resonance analysis of the polymer obtained under these conditions showed that the polymer contained the trans stereochemical configuration in a proportion of from 60 to 90 percent based on the weight of the raw material. The increased trans proportion is caused by the presence of water in the above-described proportion. Then, by hydrolyzing the polymer with an alkali or an acid, the conversion to the trans isomer further proceeds during hydrolysis and the trans isomer of 4-aminomethylcyclohexane-1-carboxylic acid at a high purity of greater than 95 percent can be easily obtained. Suitable acids to be employed in the hydrolysis, acids, such as hydrochloric acid and sulfuric acid, and suitable alkalis are sodium hydroxide, potassium hydroxide, and the like.

The hydrolysis of the polymer will be described more specifically by reference to the use of, for example, hydrochloric acid. When the hydrolysis of the polymer is conducted for a reaction period of from 4 to 30 hours at from 100° to 200°C using an aqueous hydrochloric acid solution having a concentration of from 10 to 35 percent by weight, the hydrochloride of the trans isomer of 4-aminomethylcyclohexane-1-carboxylic acid, having a melting point of 235°–238°C, can be obtained easily under these optimum conditions. Thereafter, by treating the hydrochloride with an ion-exchange resin, the trans isomer having a purity of greater than 95 percent is obtained.

Now, the invention will be explained by reference to the following examples.

EXAMPLE 1

In an autoclave were charged 20 g. of the cis isomer of 4-aminomethylcyclohexane-1-carboxylic acid and 10 g. of water. After purging the autoclave with nitrogen, the polymerization of the cis isomer was conducted for 4 hours at 280°C., whereby a polymer having 90 percent trans stereochemical orientation was obtained with a yield of almost 100 percent. One gram of the polymer was charged in an ampule together with 10 g. of an aqueous 35% hydrochloric acid solution. After purging the ampule with nitrogen, the hydrolysis of the polymer was carried out for 5 hours at 180°C. to provide the hydrochloride of the trans isomer. Then, by treating the hydrochloride with an ion-exchange resin, for example, an anion exchange resin such as Amberlite IR-45 (Rohn & Haas Co.), 0.9 g. of the trans isomer of 4-aminomethylcyclohexane-1-carboxylic acid having a melting point of 400°C. (the melting point of the compound shown in the literature is 392°C.) was obtained. The results of nuclear magnetic resonance absorption spectrum analysis confirmed the product to have a purity of greater than 98 percent trans isomer.

EXAMPLE 2

In an autoclave were charged 20 g. of 3-azabicyclo [3,2,2]-nonanone-2 and 10 g. of water. After purging the autoclave with nitrogen, the polymerization was conducted for 4 hours at 280°C., whereby a polymer having 70 percent stereochemical orientation was obtained with a yield of about 100 percent. Thereafter, 1 g. of the polymer thus obtained was charged in an ampule together with 10 g. of an aqueous 35 percent hydrochloric acid solution. After purging the ampule with nitrogen, the ampule was sealed. Then the hydrolysis of the polymer was conducted at 180°C. for 10 hours to provide the hydrochloride of the trans isomer having a melting point of 238°C. By treating the hydrochloride with an ion-exchange resin, 0.85 g. of the trans isomer of 4-aminomethylcyclohexane-1-carboxylic acid having a melting point of 400°C. was obtained. Analysis of the nuclear magnetic resonance absorption spectrum, confirmed the product to have a purity of greater than 98 percent.

EXAMPLE 3

In an autoclave were charged 10 g. of a mixture of 70 percent by weight of the cis isomer of 4-aminomethyl-cyclohexane-1-carboxylic acid and 30 percent by weight of the trans isomer of the carboxylic acid, 10 g. of azabicyclo [3,2,2]nonanone-2, and 10g. of water and the same procedure as used in Example 1 was repeated, whereby a polymer having 85 percent of the trans stereo-chemical orientation was obtained with a yield of about 100 percent. Thereafter, 1 g. of the polymer thus obtained was charged in an ampule together with 20 g. of an aqueous 20 percent sodium hydroxide solution. After purging the ampule with nitrogen, the ampule was closed and the hydrolysis was carried out for 10 hours at 180°C. to provide the alkali metal salt of the trans isomer. By treating the alkali metal salt with an ion-exchange resin, for example, a cation exchange resin such as Dia-Ion Sk-1B (Mitsubishi Chemical Industry, Ltd.), 0.7 g. of the trans isomer of 4-aminomethylcyclohexane-1-carboxylic acid having a melting point of 400°C. was obtained. Analysis of the nuclear magnetic resonance absorption spectrum, confirmed the product to have a purity of greater than 98%.

What is claimed is:
1. A process for preparing the trans isomer of 4-aminomethylcyclohexane-1 carboxylic acid which comprises:
A. polymerizing at least members selected from the group consisting of (1) a cis isomer of 4-aminomethylcyclohexane-1-carboxylic acid, (2) a mixture of said cis isomer and a trans isomer of said carboxylic acid, (3) 3-azabicyclo[3,2,2]nonanone-2, and (4) a member selected from the group consisting of (a) a mixture of said nonanone and said cis isomer, (b) a mixture of said nonanone and said trans isomer, and (c) a mixture of said nonanone, said cis isomer and said trans isomer, in the presence of from 0.2 to 60 percent by weight of water based on the weight of the raw material in the polymerization,
said polymerization being conducted at temperatures ranging from 210° to 300°C in an inert atmosphere and autogenous pressures, and
B. hydrolyzing said polymer in the presence of an acid or an alkali.
2. The process as claimed in claim 1, wherein said polymerization is conducted for from 1 to 6 hours in the presence of a member selected from the group consisting of an inert gas and steam.
3. The process as claimed in claim 1, wherein the hydrolysis product of said process is treated with an ion-exchange resin.
4. The process as claimed in claim 1, wherein said hydrolyzing of the polymer is conducted for from 4 to 30 hours at from 100° to 200°C..
5. The process as claimed in claim 1, wherein said hydrolyzing is with sodium hydroxide.
6. The process as claimed in claim 1, wherein said hydrolyzing is with hydrochloric acid.
7. The process as claimed in claim 3, wherein said hydrolyzing is with hydrochloric acid.
8. The process as claimed in claim 3, wherein said hydrolyzing is with sodium hydroxide.

* * * * *